United States Patent
Momiyama

[11] 3,999,840
[45] Dec. 28, 1976

[54] WIDE ANGLE OBJECTIVE HAVING A NON-SPHERICAL SURFACE

[75] Inventor: Kikuo Momiyama, Chofu, Japan

[73] Assignee: Canon Kabushiki Kaisha, Tokyo, Japan

[22] Filed: July 15, 1974

[21] Appl. No.: 488,733

[30] Foreign Application Priority Data
Aug. 1, 1973  Japan .................. 48-86485

[52] U.S. Cl. .................. 350/214; 350/189
[51] Int. Cl.² .................. G02B 9/64; G02B 13/04; G02B 13/18
[58] Field of Search .................. 350/189, 214

[56] References Cited
UNITED STATES PATENTS

| | | | |
|---|---|---|---|
| 3,472,577 | 10/1969 | Rosin et al. | 350/189 |
| 3,748,021 | 7/1973 | Tajima et al. | 350/214 |
| 3,762,801 | 10/1973 | Baker | 350/189 |
| 3,832,035 | 8/1974 | Takahashi | 350/189 |

*Primary Examiner*—John K. Corbin
*Assistant Examiner*—Conrad Clark
*Attorney, Agent, or Firm*—Toren, McGeady and Stanger

[57] ABSTRACT

A retrofocus wide angle objective with the backfocal length being at least two times the overall focal length, comprising in optical alignment, a plurality of negative meniscus lenses of forward convexities, a positive lens, a negative meniscus lens of forward convexity, a biconvex lens, a negative lens, a positive doublet lens and a positive lens, and the first surface counting from the front being configured in a non-spherical form such that the curvature increases with distance from the optical axis. This non-spherical surface compensates for barrel distortion and negative coma which are introduced by the object-side negative meniscus lenses into the lens system.

3 Claims, 15 Drawing Figures

FIG. 4A
SPHERICAL ABERRATION
SINE CONDITION

FIG. 4B
ASTIGMATISM

FIG. 4C
DISTORTION

FIG. 4D
LATERAL ABERRATION

WIDE ANGLE OBJECTIVE HAVING A NON-SPHERICAL SURFACE

BACKGROUND OF THE INVENTION

This invention relates to a wide angle objective for a single lens reflex camera.

Objectives for single lens reflex cameras are required to have a back focal length sufficiently long to permit for the quick return operation of the mirror mechanism. In single lens reflex cameras of 35mm format type, it is necessary that this distance be at least 36mm. Wide angle objectives for such single lens reflex cameras are constructed in the form of retrofocus lens in which concave lenses are arranged in the object-side of the lens system for the purpose of meeting the aforementioned requirement. These concave lenses contribute an increase in the back focal length to the lens system, but they have adverse effects on the correction of aberrations, because of the asymmetry of lens configuration of the resulting lens system with respect to the center thereof. Particularly barrel distortion and negative coma which are produced by the object-side concave lenses are more difficult to be corrected in high degree over the entire field. As the field angle of the objective increases, or as the overall focal length is decreased, it is necessary to increase the retro ratio, or the ratio of the back focal length to the overall focal length. As a result, the asymmetry of the lens configuration is intensified which complicates the correction of the aforementioned aberrations. Particularly with wide angle objectives which operate with a retro ratio of more than two, it is impossible to preserve a high standard imagery with respect to the aforementioned aberrations so long as all of the refracting surfaces in the lens system are spherical.

SUMMARY OF THE INVENTION

The present invention has for the primary object to provide a wide angle objective which operates with a retro ratio of more than two and of which the first surface counting from the front is configured in a non-spherical form such that the curvature is increased with distance from the optical axis by the use of which the barrel distortion and negative coma produced by the object-side negative meniscus lenses are corrected.

DESCRIPTION OF THE PREFERRED EMBODIMENTS

Aberration correction of an optical lens system is facilitated by the provision of a non-spherical surface. For the most effective correction of the aforementioned distortion and coma aberrations by the non-spherical surface, it is preferred to arrange the non-spherical surface in a position where an extra-axial oblique pencil of light rays passes across it at a longest distance from the optical axis. This is because oblique aberrations are susceptible to the surface of higher incident height and because the axial aberrations are influenced by the surface to a smaller extent. For this reason, in the retrofocus objective in which an oblique pencil of light cuts across the first surface at a point extremely farther from the optical axis than the other surfaces. Therefore, if the most effective correction of aberrations is to be effected, the non-spherical surface is used in the place of the first surface.

Figure 1:
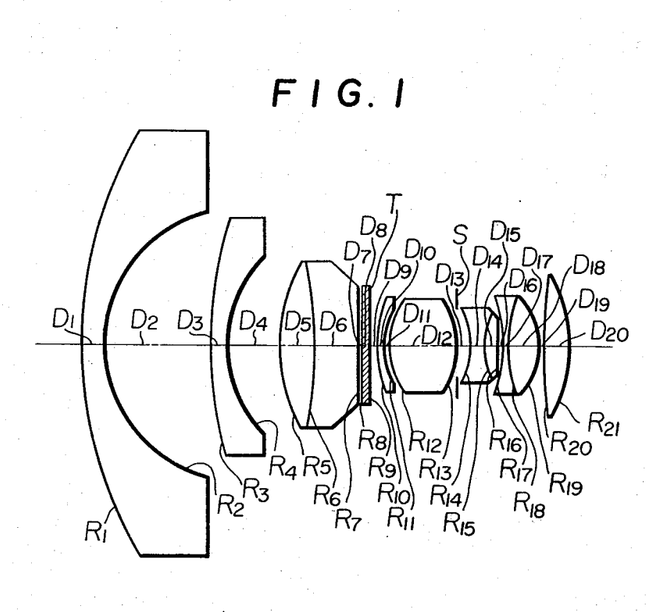
FIG. 1 is a diagrammatic view of an objective optical system according to Example 1 of the present invention.
Figure 2A:
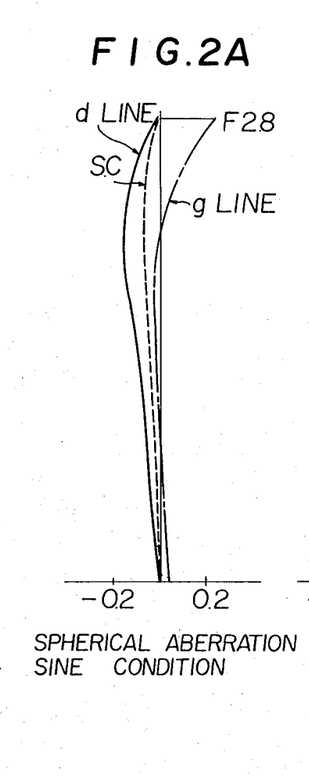
FIGS. 2A, 2B, 2C and 2D are curves illustrating various aberrations of the optical system of FIG. 1.
Figures 2B, 2C:
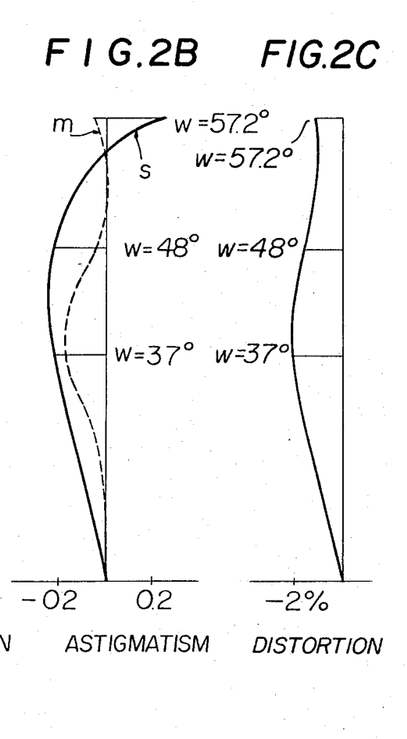
Figure 2D:
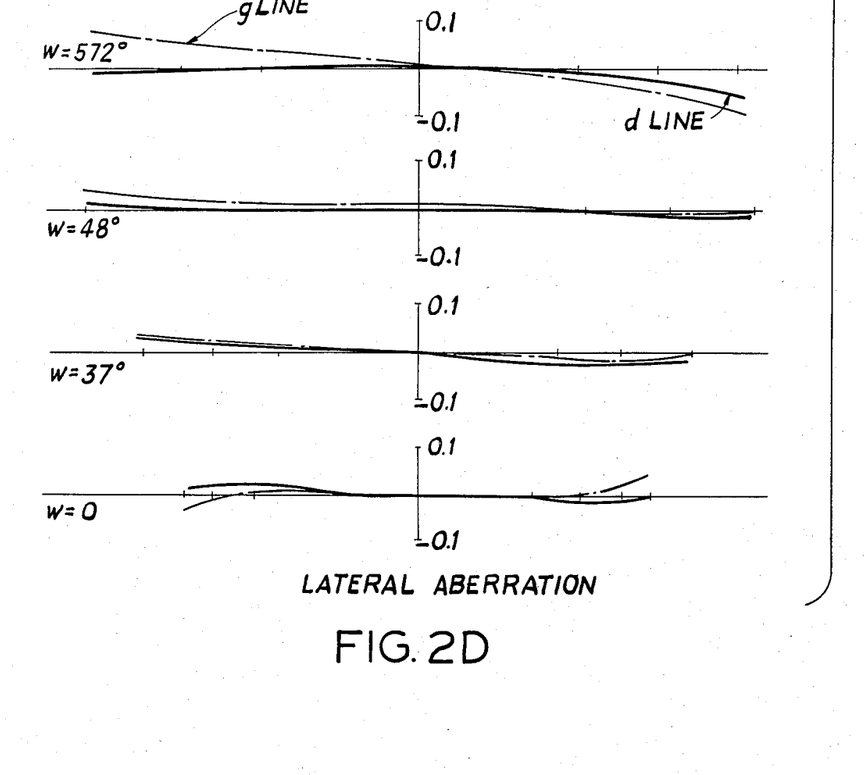
Figure 3:
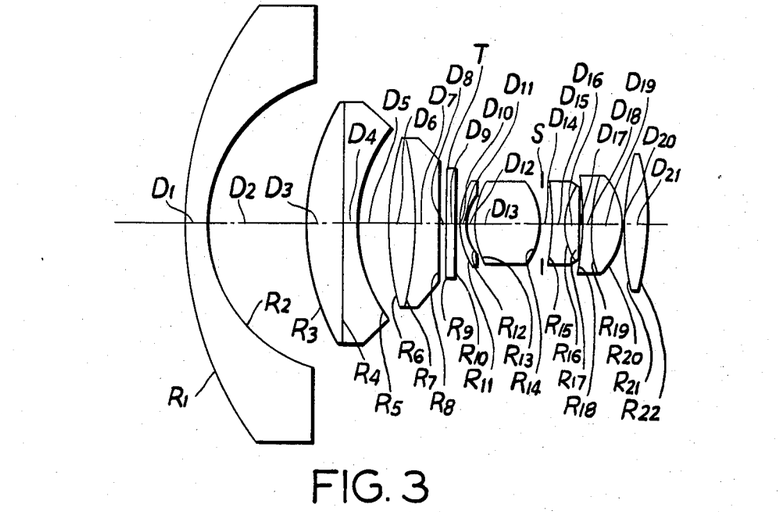
FIG. 3 is a diagrammatic view of an objective optical system according to Example 2 of the present invention.
Figure 4A:
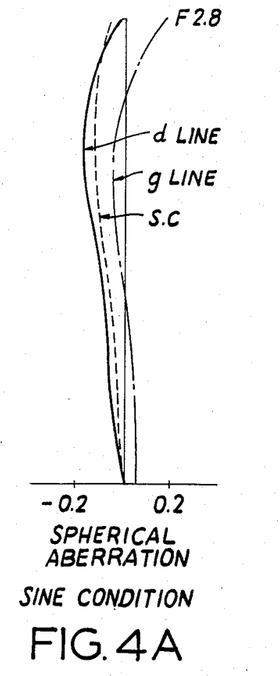
FIGS. 4A, 4B, 4C and 4D are curves illustrating various aberrations of the optical system of FIG. 2.
Figure 4B:
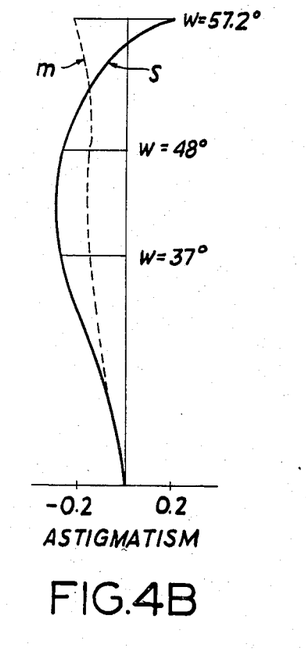
Figure 4C:
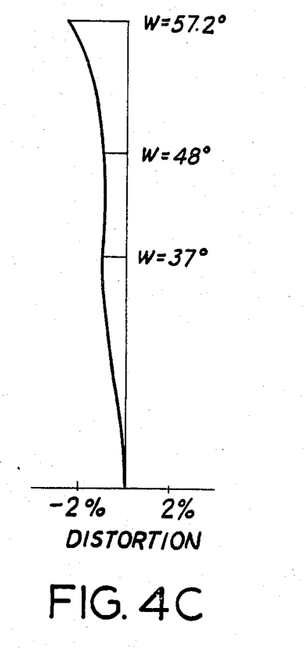
Figure 4D:
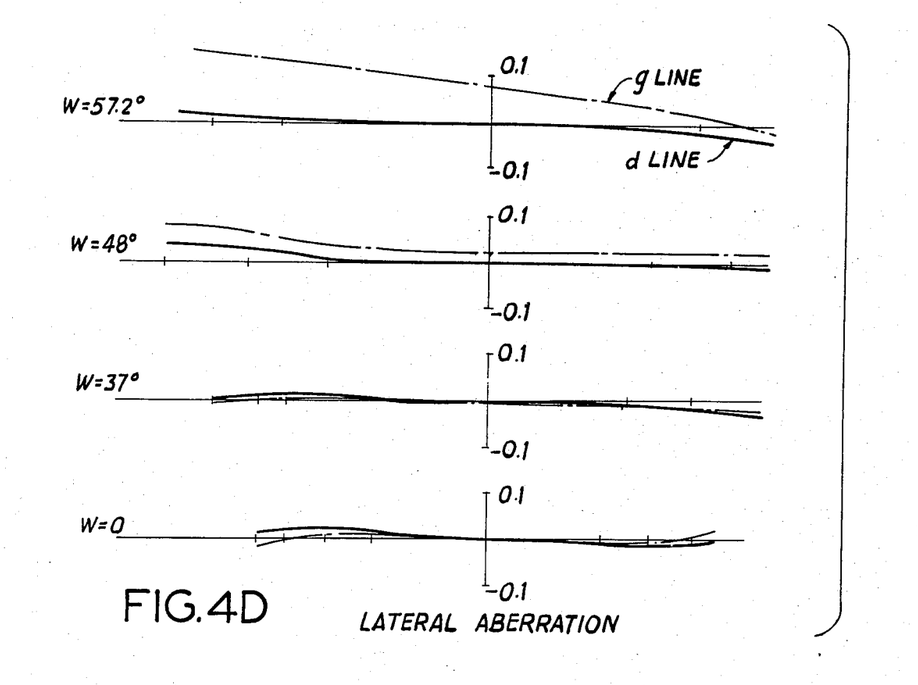
Figure 5:
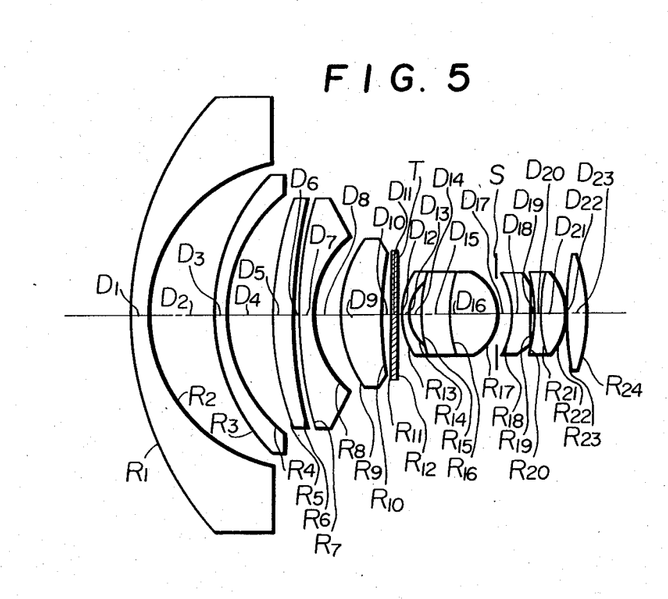
FIG. 5 is a diagrammatic view of an objective optical system according to Example 3 of the present invention.
Figure 6A:
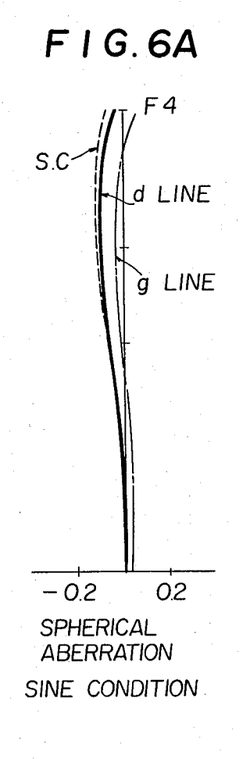
FIGS. 6A, 6B, 6C and 6D are curves illustrating various aberrations of the optical system of FIG. 5.
Figures 6B, 6C:
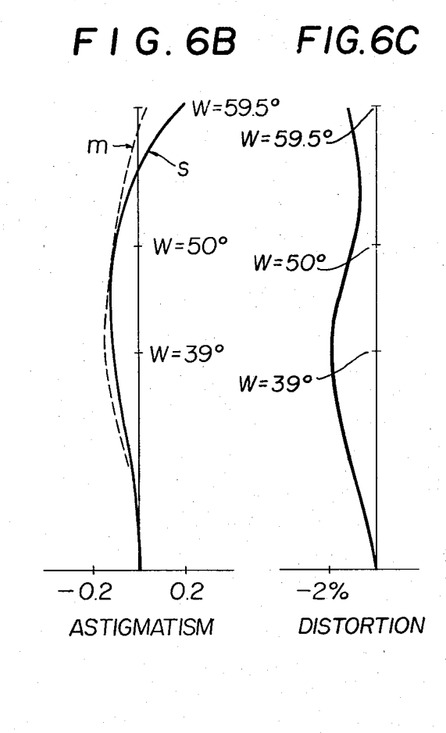
Figure 6D:
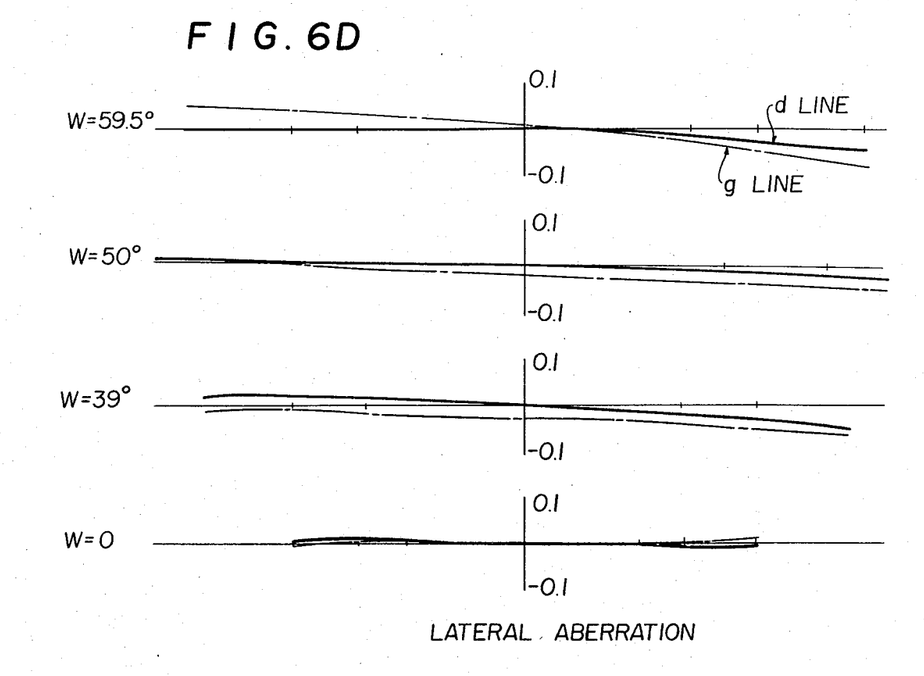

On the other hand, as shown in FIGS. 1, 3 and 5, the objective optical system in accordance with the present invention is constructed as comprising eight optically aligned lens members. A first member counting from the front comprises one or two negative meniscus lenses of forward convexities. A second member comprises a negative meniscus lens component of forward convexity which is in the form of either a singlet, or a doublet composed of a positive lens and a negative lens cemented together at their adjoining surfaces, or, if desired, it may be composed of a positive meniscus lens and a negative meniscus lens spaced apart from each other at a minute air space. A third member comprises a positive lens component with the front surface having a smaller radius of convex curvature which is in the form of either a singlet or doublet of a bi-convex lens and a negative lens cemented together. A fourth member is a negative meniscus lens of forward convexity. A fifth member comprises a bi-convex lens component which is in the form of either a singlet or a doublet composed of a positive meniscus lens and a bi-convex lens cemented together. A sixth member comprises a negative lens component of forward concavity which is in the form of either a singlet or a doublet composed of a bi-convex lens and a convex lens cemented together. A seventh member is a positive meniscus doublet of forward concavity composed of a bi-concave lens and a bi-convex lens cemented together. An eighth member is a bi-convex lens. A diaphragm is located between the fifth and sixth members.

Further, the retrofocus objective of the construction described above has the first surface which is configured in a non-spherical form represented by the general formula $$X = \frac{Y^2}{R_1 - R_1\sqrt{1 - \left(\frac{r}{R_1}\right)^2}} + BY^4 + CY^6 + DY^8 + EY^{10} + \ldots$$

wherein
X : The abscissa taken along the direction of incoming light on the optical axis.
Y : the ordinate perpendicular to the abscissa $R_1$: the radius of curvature of the first non-spherical surface at the vertex, being characterized in that $$\frac{0.0005}{f^3} < B < \frac{0.1}{f^3}$$

wherein $f$ is the overall focal length of the system.

This non-spherical surface is in such a form that the curvature is increased with distance from the optical axis. Particularly by defining the non-spherical coefficient of the fourth order term as $0.0005/f^3 < B < 0.1/f^3$, the aforementioned aberrations which are introduced by the object-side concave lenses into the lens system can be well compensated for. When the lower limit is violated, the correction of the aforesaid aberrations is more difficult to accomplish. When the upper limit is violated, the correction of astigmatism and higher order aberrations are more difficult to accomplish.

The relationship set out above facilitates the correction of various aberrations of the retrofocus wide angle objective. As far as the best lens design is concerned, the high degree of correction is obtainable by the use of certain relationships set out in detail below. The relationships are particularly concerned with the negative meniscus lens of the fourth member arranged in rear of the plurality of negative meniscus lenses and a positive lens, the bi-convex lens of the fifth member arranged just in front of the diaphragm and the positive cemented meniscus lens of the seventh member arranged beyond the sixth member rearwardly from the diaphragm.

$$0.7 < |R_s| < 2.0 \quad R_s < 0 \qquad (1)$$

wherein $R_s$ is the radius of curvature of the rear surface of the fifth member, or of the surface just in front of the diaphragm.

$$\overline{N}a < \overline{N}b \qquad (2)$$

wherein $\overline{N}a$ is the average value of the refractive indices of all the positive lens elements in the objective, and $\overline{N}b$ is the average value of the refractive indices of all the negative lens elements in the objective.

$$1.65 < N_{IV} < 2.0 \qquad (3)$$

wherein $N_{IV}$ is the refractive index of the fourth member, or in general, of the negative lens arranged in front of the positive lens just in front of the diaphragm.

$$0.2 < (N_{VIIb} - N_{VIIa}) < 0.5 \qquad (4)$$

wherein $N_{VIIa}$ is the refractive index of the positive lens in the seventh member, or in general, the cemented lens component in the rear of the negative lens component just in rear of the diaphragm, and $N_{VIIb}$ is the refractive index of the negative lens in the same lens component.

These relationships have the following meanings.
Relationship (1): In order to effect a good state of correction of coma aberrations it is necessary that the surface just in front of the diaphragm is of relatively strong convex curvature to produce a positive coma which is balanced with the negative coma introduced into the system by the object-side concave lenses. When the upper limit is violated, a good state of correction of coma is made difficult. When the lower limit is violated, spherical aberrations and astigmatism deteriorate. For a severer condition, the upper limit may be defined as 1.7.

Relationship (2) facilitates the compensation for over-correction of curvature of field which becomes serious in the retrofocus wide angle objective. By selecting all the concave lenses having an average refractive index higher than the average refractive index of all the convex lenses, the Petzval sum is prevented from being over-corrected and the curvature of field is reduced.

Relationship (3) cooperates with relationship (2) to reduce the positive spherical aberrations as well as field curvature of the fourth member by selecting a particularly high refractive index glass for employment in the fourth member of particularly strong curvature.

Relationship (4): as the refractive index of the negative lens in the seventh member is comparatively higher than that of the positive lens thereof, a diverging action is imparted to the cemented surface at the adjoining lens surfaces of the doublet composed of these negative and positive lenses so as to influence in a desirable manner the correction of extra-axial aberrations. This correction operates effectively with the marginal portions of the image so that a good state of correction of field curvature, coma and distortion is preserved over the entire field. For severer conditions, the lower limit may be defined as 0.25.

Three examples of a specific wide angle objective optical system may be constructed in accordance with the numerical data given in Tables 1 through 12 below with respect to the characteristics of the various elements of the lens system and their spatial relationships to each other, non-spherical surface factors and aberration coefficients. As is evident from the aberration curves in FIG. 2, a lens system constructed according to the specified numerical data in Table 1 is well corrected for various aberrations. The various symbols in the tables have the following meaning.

R: the radii of curvature of the respective lens elements

D: the axial thicknesses of the respective lens elements and axial air spaces between the successive lens elements Nd: the refractive indices for the d line of the sodium spectrum of the respective material glasses T: an interchangeable filter S: a diaphragm.

* the radius of curvature of the non-spherical surface at the vertex on the optical axis.

Example 1:

$f = 14.300$
$FNo = 2.8$
$2\omega = 114.2°$

Table 1

| No. | R | D | Nd | νd |
|---|---|---|---|---|
| 1 | 258.12900* | 5.00000 | 1.60311 | 60.7 |
| 2 | 29.28800 | 22.65400 | | |
| 3 | 78.02500 | 2.50000 | 1.77250 | 49.6 |
| 4 | 24.55600 | 12.42500 | | |
| 5 | 43.10800 | 7.00000 | 1.72151 | 29.2 |
| 6 | 78.36300 | 8.74400 | 1.62041 | 60.3 |
| 7 | ∞ | 1.50000 | | |
| 8 ⎱ T | ∞ | 1.80000 | 1.51633 | 64.1 |
| 9 ⎰ | ∞ | 0.50000 | | |
| 10 | 24.56600 | 1.50000 | 1.77250 | 49.6 |
| 11 | 13.65000 | 1.50000 | | |
| 12 | 18.16500 | 14.64000 | 1.48749 | 70.1 |
| 13 | −19.15600 | 3.00000 | | |
| 14 | −18.53300 | 2.50000 | 1.62041 | 60.3 |

Table 1-continued

| No. | R | D | Nd | νd |
|---|---|---|---|---|
| 15 | 15.85200 | 3.00000 | 1.72151 | 29.2 |
| 16 | −303.07100 | 1.00000 | | |
| 17 | −33.46500 | 1.00000 | 1.92286 | 20.9 |
| 18 | 29.20100 | 7.00000 | 1.48749 | 70.1 |
| 19 | −15.92400 | 0.10000 | | |
| 20 | 82.10500 | 5.80000 | 1.77250 | 49.6 |
| 21 | −35.13000 | | | |

$\Sigma D = 103.16300$
b, f = 36.497

Table 2

| Configuration of the non-spherical surface | |
|---|---|
| Y | X |
| 0. | 0. |
| 2.00000 | 0.00780 |
| 4.00000 | 0.03189 |
| 6.00000 | 0.07426 |
| 8.00000 | 0.13818 |
| 10.00000 | 0.22805 |
| 12.00000 | 0.34931 |
| 14.00000 | 0.50824 |
| 16.00000 | 0.71177 |
| 18.00000 | 0.96733 |
| 20.00000 | 1.28269 |
| 22.00000 | 1.66578 |
| 24.00000 | 2.12471 |
| 26.00000 | 2.66780 |
| 28.00000 | 3.30377 |
| 30.00000 | 4.04215 |
| 32.00000 | 4.89395 |
| 34.00000 | 5.87262 |
| 36.00000 | 6.99547 |
| 38.00000 | 8.28552 |
| 40.00000 | 9.77407 |
| 42.00000 | 11.50391 |
| 44.00000 | 13.53344 |

TABLE 3

Non-spherical surface coefficients
$B = 3.5235 \times 10^{-6}$
$C = -9.7912 \times 10^{-10}$
$D = 2.0882 \times 10^{-13}$
$E = 2.6494 \times 10^{-17}$ Table 4

| | Aberration coefficients | | | | |
|---|---|---|---|---|---|
| No. | I | II | III | P | V |
| 1 | 0.0497 | −0.1034 | 0.2279 | 0.0208 | 0.0390 |
| 2 | −0.1493 | 0.0774 | −0.0401 | −0.1837 | 0.1161 |
| 3 | 0.0895 | 0.0578 | 0.0373 | 0.0799 | 0.0757 |
| 4 | −2.1807 | 0.4734 | −0.1028 | −0.2538 | 0.0774 |
| 5 | 2.3207 | −0.0329 | 0.0005 | 0.1390 | −0.0020 |
| 6 | 0.0021 | −0.0030 | 0.0042 | 0.0066 | −0.0153 |
| 7 | −0.0070 | −0.0172 | −0.0423 | 0 | −0.1040 |
| 8 | 0.0065 | 0.0159 | 0.0390 | 0 | 0.0958 |
| 9 | −0.0065 | −0.0160 | −0.0392 | 0 | −0.0964 |
| 10 | 1.9469 | 0.2739 | 0.0385 | 0.2537 | 0.0411 |
| 11 | −24.8080 | 0.3994 | −0.0064 | −0.4566 | 0.0075 |
| 12 | 14.1201 | 0.3550 | 0.0089 | 0.2580 | 0.0067 |
| 13 | 10.8293 | −2.0166 | 0.3755 | 0.2446 | −0.1155 |
| 14 | −10.3206 | 1.6653 | −0.2687 | −0.2954 | 0.0910 |
| 15 | 1.8608 | 0.3714 | 0.0741 | 0.0327 | 0.0213 |
| 16 | 0.0012 | −0.0044 | 0.0167 | 0.0198 | −0.1380 |
| 17 | −0.4540 | 0.1801 | −0.0715 | −0.2051 | 0.1097 |
| 18 | −6.4304 | −1.7416 | −0.4717 | −0.0745 | −0.1479 |
| 19 | 5.3082 | −0.0418 | 0.0003 | 0.2943 | −0.0023 |
| 20 | 0.2039 | 0.1645 | 0.1327 | 0.0759 | 0.1683 |
| 21 | 9.9433 | 0.1216 | 0.0015 | 0.1774 | 0.0022 |
| Σ | 2.3258 | 0.1790 | −0.0855 | 0.1337 | 0.2303 |

EXAMPLE 2:

$f = 14.3$
$FNo = 2.8$
$2\omega = 114.20°$

Table 5

| No. | R | D | Nd | νd |
|---|---|---|---|---|
| 1 | 141.395* | 5.000 | 1.60311 | 60.7 |
| 2 | 31.477 | 22.770 | | |
| 3 | 61.359 | 6.000 | 1.72151 | 29.2 |
| 4 | 936.733 | 2.500 | 1.77250 | 49.6 |
| 5 | 27.667 | 8.466 | | |
| 6 | 80.973 | 5.000 | 1.80518 | 25.4 |
| 7 | −88.739 | 5.958 | 1.64328 | 47.9 |
| 8 | ∞ | 1.500 | | |
| 9 | ∞ | 1.800 | 1.51633 | 64.1 |
| 10 }T | ∞ | 0.500 | | |
| 11 | 20.662 | 1.000 | 1.77250 | 49.6 |
| 12 | 9.627 | 3.000 | | |
| 13 | 16.950 | 13.432 | 1.48749 | 70.1 |
| 14 | −14.296 | 3.000 | | |
| 15 | −28.095 | 2.870 | 1.62041 | 60.3 |
| 16 | 21.179 | 2.500 | 1.72151 | 29.2 |
| 17 | 89.099 | 1.000 | | |
| 18 | −36.119 | 1.000 | 1.84666 | 23.9 |
| 19 | 28.905 | 7.000 | 1.48749 | 70.1 |
| 20 | −16.098 | 0.100 | | |
| 21 | 66.585 | 5.800 | 1.77250 | 49.6 |
| 22 | −41.712 | | | |

$\Sigma D = 100.196$
b, f = 3.6500

Table 6

| Configuration of the non-spherical surface | |
|---|---|
| Y | X |
| 0. | 0. |
| 2.00000 | 0.01419 |
| 4.00000 | 0.05723 |
| 6.00000 | 0.13060 |
| 8.00000 | 0.23665 |
| 10.00000 | 0.37861 |
| 12.00000 | 0.56040 |
| 14.00000 | 0.78661 |
| 16.00000 | 1.06233 |
| 18.00000 | 1.39305 |
| 20.00000 | 1.78461 |
| 22.00000 | 2.24313 |
| 24.00000 | 2.77508 |
| 26.00000 | 3.38734 |
| 28.00000 | 4.08744 |
| 30.00000 | 4.88381 |
| 32.00000 | 5.78628 |
| 34.00000 | 6.80659 |
| 36.00000 | 7.95916 |
| 38.00000 | 9.26191 |
| 40.00000 | 10.73736 |
| 42.00000 | 12.41376 |

Table 6-continued

| Configuration of the non-spherical surface | |
|---|---|
| Y | X |
| 44.00000 | 14.32645 |

TABLE 7

Non-spherical surface coefficients
$B = 2.5263 \times 10^{-6}$
$C = 7.4595 \times 10^{-10}$
$D = 2.6068 \times 10^{-13}$
$E = -1.5147 \times 10^{-17}$ Table 8

| | Aberration coefficients | | | | |
|---|---|---|---|---|---|
| | I | II | III | P | V |
| 1 | 0.0359 | −0.0823 | 0.2125 | 0.0380 | −0.0794 |
| 2 | −0.0995 | 0.0596 | −0.0357 | −0.1709 | 0.1238 |
| 3 | 0.0754 | 0.0413 | 0.0226 | 0.0977 | 0.0659 |
| 4 | 0.0000 | 0.0000 | 0.0001 | 0.0003 | 0.0107 |
| 5 | −0.9640 | 0.0798 | −0.0066 | −0.2253 | 0.0192 |
| 6 | 0.4378 | 0.1454 | 0.0483 | 0.0788 | 0.0422 |
| 7 | −0.0001 | 0.0004 | −0.0013 | 0.0088 | −0.0247 |
| 8 | −0.0147 | −0.0315 | −0.0674 | 0. | −0.1443 |
| 9 | 0.0134 | 0.0286 | 0.0613 | 0. | 0.1314 |
| 10 | −0.0135 | −0.0290 | −0.0620 | 0. | −0.1328 |
| 11 | 1.8097 | 0.3042 | 0.0511 | 0.3016 | 0.0593 |
| 12 | −41.1144 | 2.2059 | −0.1184 | −0.6474 | 0.0411 |
| 13 | 20.1014 | 0.4642 | 0.0107 | 0.2765 | 0.0066 |
| 14 | 18.3026 | −2.7499 | 0.4132 | 0.3278 | −0.1113 |
| 15 | −4.6836 | 1.0416 | −0.2316 | −0.1949 | 0.0949 |
| 16 | 0.6534 | 0.1635 | 0.0409 | 0.0245 | 0.0164 |
| 17 | −0.0810 | −0.0855 | −0.0903 | −0.0673 | −0.1663 |
| 18 | −0.1521 | 0.0794 | −0.0415 | −0.1815 | 0.1164 |
| 19 | −5.7558 | −1.5051 | −0.3936 | −0.0647 | −0.1198 |
| 20 | 5.8615 | −0.0601 | 0.0006 | 0.2911 | −0.0030 |
| 21 | 0.2578 | 0.1870 | 0.1357 | 0.0936 | 0.1664 |
| 22 | 8.0483 | −0.1011 | 0.0013 | 0.1494 | −0.0019 |
| Σ | 2.7184 | 0.1564 | −0.0500 | 0.1362 | 0.1105 |

EXAMPLE 3:

$f = 13.0$
$FNo = 4.0$
$2\omega = 119°$

Table 9

| No. | R | D | Nd | νd |
|---|---|---|---|---|
| 1 | 147.341* | 4.000 | 1.64000 | 60.2 |
| 2 | 32.584 | 13.145 | | |
| 3 | 41.808 | 3.000 | 1.64000 | 60.2 |
| 4 | 31.301 | 10.825 | | |
| 5 | 76.838 | 5.000 | 1.80518 | 25.4 |
| 6 | 154.018 | 0.200 | | |
| 7 | 101.770 | 2.500 | 1.77250 | 49.6 |
| 8 | 20.599 | 5.525 | | |
| 9 | 25.164 | 9.624 | 1.75520 | 27.5 |
| 10 | 152.475 | 1.500 | | |
| 11 } T | ∞ | 1.800 | 1.51633 | 64.1 |
| 12 | ∞ | 0.500 | | |
| 13 | 14.142 | 1.000 | 1.88300 | 41.0 |
| 14 | 7.486 | 3.000 | | |
| 15 | 26.776 | 5.891 | 1.75520 | 27.5 |
| 16 | 43.727 | 7.000 | 1.51633 | 64.1 |
| 17 | −10.620 | 2.500 | | |
| 18 | −25.398 | 4.788 | 1.75520 | 27.5 |
| 19 | −915.785 | 1.000 | | |
| 20 | −24.503 | 1.000 | 1.88300 | 41.0 |

Table 9-continued

| No. | R | D | Nd | νd |
|---|---|---|---|---|
| 21 | 36.421 | 5.000 | 1.48749 | 70.1 |
| 22 | −13.504 | 0.100 | | |
| 23 | 62.000 | 4.500 | 1.77250 | 49.6 |
| 24 | −37.307 | | | |

$\Sigma D = 93.398$
b, $f = 36.500$

Table 10

| Configuration of the non-spherical surface | |
|---|---|
| Y | X |
| 0. | 0. |
| 2.00000 | 0.01361 |
| 4.00000 | 0.05490 |
| 6.00000 | 0.12523 |
| 8.00000 | 0.22689 |
| 10.00000 | 0.36309 |
| 12.00000 | 0.53800 |
| 14.00000 | 0.75669 |
| 16.00000 | 1.02513 |
| 18.00000 | 1.35012 |
| 20.00000 | 1.73919 |
| 22.00000 | 2.20046 |
| 24.00000 | 2.74257 |
| 26.00000 | 3.37461 |
| 28.00000 | 4.10610 |
| 30.00000 | 4.94735 |
| 32.00000 | 5.90993 |
| 34.00000 | 7.00783 |
| 36.00000 | 8.25921 |
| 38.00000 | 9.68926 |
| 40.00000 | 11.33427 |
| 42.00000 | 13.24758 |
| 44.00000 | 15.50770 |

TABLE 11

Non-spherical surface coefficients
$B = 2.31920 \times 10^{-6}$
$C = 1.95593 \times 10^{-10}$
$D = -3.74324 \times 10^{-13}$
$E = 1.44546 \times 10^{-16}$ Table 12

| | Aberration coefficients | | | | |
|---|---|---|---|---|---|
| No. | I | II | III | P | V |
| 1 | 0.0263 | −0.0611 | 0.1631 | 0.0344 | 0.0646 |
| 2 | −0.0750 | 0.0373 | −0.0186 | −0.1557 | 0.0868 |
| 3 | 0.0802 | 0.0113 | 0.0016 | 0.1213 | 0.0173 |

Table 12-continued

| | Aberration coefficients | | | | |
|---|---|---|---|---|---|
| No. | I | II | III | P | V |
| 4 | −0.1999 | 0.0283 | −0.0040 | −0.1621 | 0.0235 |
| 5 | 0.0922 | 0.0586 | 0.0372 | 0.0755 | 0.0716 |
| 6 | −0.0197 | −0.0334 | −0.0567 | −0.0376 | −0.1601 |
| 7 | 0.0312 | 0.0405 | 0.0526 | 0.0557 | 0.1406 |
| 8 | −2.8060 | 0.4420 | −0.0696 | −0.2750 | 0.0543 |
| 9 | 3.3812 | −0.2150 | 0.0137 | 0.2223 | −0.0150 |
| 10 | −0.0275 | −0.0409 | −0.0608 | −0.0367 | −0.1449 |
| 11 | 0.0049 | 0.0150 | 0.0459 | 0. | 0.1405 |
| 12 | −0.0049 | −0.0151 | −0.0463 | 0. | −0.1417 |
| 13 | 3.2757 | 0.3301 | 0.0333 | 0.4310 | 0.0468 |
| 14 | −61.4426 | 3.6433 | −0.2160 | −0.8143 | 0.0611 |
| 15 | 14.3464 | 1.0856 | 0.0821 | 0.2089 | 0.0220 |
| 16 | −1.0162 | −0.1811 | −0.0323 | −0.0267 | −0.0105 |
| 17 | 44.0612 | −4.7455 | 0.5111 | 0.4168 | −0.0999 |
| 18 | −8.1225 | 1.4860 | −0.2718 | −0.2202 | 0.0900 |
| 19 | −0.0003 | −0.0026 | −0.0212 | 0.0061 | −0.1214 |
| 20 | −0.8646 | 0.2371 | −0.0650 | −0.2488 | 0.0861 |
| 21 | −7.2559 | −1.6397 | −0.3706 | −0.0504 | −0.0951 |
| 22 | 8.8625 | −0.1625 | 0.0030 | 0.3155 | −0.0058 |
| 23 | 0.5642 | 0.3102 | 0.1706 | 0.0914 | 0.1440 |
| 24 | 10.1347 | −0.3495 | 0.0121 | 0.1519 | −0.0057 |
| Σ | 3.0255 | 0.2788 | −0.1068 | 0.1033 | 2.2491 |

What is claimed is:

1. A wide angle objective optical system comprising a lens system wherein the first surface of the system is configured in a non-spherical form and is represented by the formula $$X = \frac{Y^2}{R_1 - R_1\sqrt{1-\left(\frac{Y}{R_1}\right)^2}} + BY^4 + CY^6 + DY^8 + EY^{10}$$

wherein
X : the abscissa taken along the optical axis in the direction of incoming light,
Y : the ordinate perpendicular to the abscissa,
$R_1$ : the radius of curvature of the non-spherical surface at the vertex of the optical axis and wherein the optical elements have the following data:
$f = 14.300$
$FN_o = 2.8$
$2\omega = 114.2°$

| No. | R | D | Nd | νd |
|---|---|---|---|---|
| 1 | 258.12900* | 5.00000 | 1.60311 | 60.7 |
| 2 | 29.28800 | 22.65400 | | |
| 3 | 78.02500 | 2.50000 | 1.77250 | 49.6 |
| 4 | 24.55600 | 12.42500 | | |
| 5 | 43.10800 | 7.00000 | 1.72151 | 29.2 |
| 6 | 78.36300 | 8.74400 | 1.62041 | 60.3 |
| 7 | ∞ | 1.50000 | | |
| 8 ⎫T | ∞ | 1.80000 | 1.51633 | 64.1 |
| 9 ⎭ | ∞ | 0.50000 | | |
| 10 | 24.56600 | 1.50000 | 1.77250 | 49.6 |
| 11 | 13.65000 | 1.50000 | | |
| 12 | 18.16500 | 14.64000 | 1.48749 | 70.1 |
| 13 | −19.15600 | 3.00000 | | |
| 14 | −18.53300 | 2.50000 | 1.62041 | 60.3 |
| 15 | 15.85200 | 3.00000 | 1.72151 | 29.2 |
| 16 | −303.07100 | 1.00000 | | |
| 17 | −33.46500 | 1.00000 | 1.92286 | 20.9 |
| 18 | 29.20100 | 7.00000 | 1.48749 | 70.1 |
| 19 | −15.92400 | 0.10000 | | |
| 20 | 82.10500 | 5.80000 | 1.77250 | 49.6 |
| 21 | −35.13000 | | | |
| | $\Sigma_D = 103.16300$ | | | | b,f = 36,497

R : the radii of curvature of the respective lens elements;
D : the axial thicknesses of the respective lens elements and axial air spaces between the successive lens elements;
Nd : the refractive indices for the d line of the sodium spectrum of the respective material glasses;
T : an interchangeable filter;
S : a diaphragm;
* the radius of curvature of the non-spherical surface at the vertex on the optical axis;
and wherein the non-spherical surface has a configuration as indicated by the following relationship between X and Y:

| Y | K |
|---|---|
| 0. | 0. |
| 2.00000 | 0.00780 |
| 4.00000 | 0.03189 |
| 6.00000 | 0.07426 |
| 8.00000 | 0.13818 |
| 10.00000 | 0.22805 |
| 12.00000 | 0.34931 |
| 14.00000 | 0.50824 |
| 16.00000 | 0.71177 |
| 18.00000 | 0.96733 |
| 20.00000 | 1.28269 |
| 22.00000 | 1.66578 |
| 24.00000 | 2.12471 |
| 26.00000 | 2.66780 |
| 28.00000 | 3.30377 |
| 30.00000 | 4.04215 |
| 32.00000 | 4.89395 |
| 34.00000 | 5.87262 |
| 36.00000 | 6.99547 |
| 38.00000 | 8.28552 |
| 40.00000 | 9.77407 |
| 42.00000 | 11.50391 |
| 44.00000 | 13.53344 |

2. A wide angle objective optical system comprising a lens system wherein the first surface of the system is configured in a non-spherical form and is represented by the formula $$X = \frac{Y^2}{R_1 - R_1\sqrt{1 - \left(\frac{Y}{R_1}\right)^2}} + BY^4 + CY^6 + DY^8 + EY^{10}$$

wherein
X : the abscissa taken along the optical axis in the direction of incoming light,
Y : the ordinate perpendicular to the abscissa,
$R_1$ : the radius of curvature of the non-spherical surface at the vertex of the optical axis and wherein the optical elements have the following data:
$f = 14.3$
$FN_o = 2.8$
$2\omega = 114.20°$

| No. | R | D | Nd | νd |
|---|---|---|---|---|
| 1 | 141.395* | 5.000 | 1.60311 | 60.7 |
| 2 | 31.477 | 22.770 | | |
| 3 | 61.359 | 6.000 | 1.72151 | 29.2 |
| 4 | 936.733 | 2.500 | 1.77250 | 49.6 |
| 5 | 27.667 | 8.466 | | |
| 6 | 80.973 | 5.000 | 1.80518 | 25.4 |
| 7 | −88.739 | 5.958 | 1.64328 | 47.9 |
| 8 | ∞ | 1.500 | | |
| 9 ⎫ T | ∞ | 1.800 | 1.51633 | 64.1 |
| 10 ⎭ | ∞ | 0.500 | | |
| 11 | 20.662 | 1.000 | 1.77250 | 49.6 |
| 12 | 9.627 | 3.000 | | |
| 13 | 16.950 | 13.432 | 1.48749 | 70.1 |
| 14 | −14.296 | 3.000 | | |
| 15 | −28.095 | 2.870 | 1.62041 | 60.3 |
| 16 | 21.179 | 2.500 | 1.72151 | 29.2 |
| 17 | 89.099 | 1.000 | | |
| 18 | −36.119 | 1.000 | 1.84666 | 23.9 |
| 19 | 28.905 | 7.000 | 1.48749 | 70.1 |
| 20 | −16.098 | 0.100 | | |
| 21 | 66.585 | 5.800 | 1.77250 | 49.6 |
| 22 | −41.712 | | | |

ΣD = 100.196
b, f = 3.6500 wherein the symbols have the following meaning:
R : the radii of curvature of the respective lens elements;
D : the axial thicknesses of the respective lens elements and axial air spaces between the successive lens elements;
Nd : the refractive indices for the $d$ line of the sodium spectrum of the respective material glasses;
T : an interchangeable filter;
S : a diaphragm;
* the radius of curvature of the non-spherical surface at the vertex on the optical axis;
and wherein the non-spherical surface has a configuration as indicated by the following relationship between X and Y:

| Y | X |
|---|---|
| 0. | 0. |
| 2.00000 | 0.01419 |
| 4.00000 | 0.5723 |
| 6.00000 | 0.13060 |
| 8.00000 | 0.23665 |
| 10.00000 | 0.37861 |
| 12.00000 | 0.56040 |
| 14.00000 | 0.78661 |
| 16.00000 | 1.06233 |
| 18.00000 | 1.39305 |
| 20.00000 | 1.78461 |
| 22.00000 | 2.24313 |
| 24.00000 | 2.77508 |
| 26.00000 | 3.38734 |

-continued

| Y | X |
|---|---|
| 28.00000 | 4.08744 |
| 30.00000 | 4.88381 |
| 32.00000 | 5.78628 |
| 34.00000 | 6.80659 |
| 36.00000 | 7.95916 |
| 38.00000 | 9.26191 |
| 40.00000 | 10.73736 |
| 42.00000 | 12.41376 |
| 44.00000 | 14.32645 |

3. A wide angle objective optical system comprising a lens system wherein the first surface of the system is configured in a non-spherical form and is represented by the formula $$X = \frac{Y^2}{R_1 - R_1\sqrt{1 - \left(\frac{Y}{R_1}\right)^2}} + BY^4 + CY^6 + DY^8 + EY^{10}$$

wherein
X : the abscissa taken along the optical axis in the direction of incoming light,
Y : the ordinate perpendicular to the abscissa,
$R_1$ : the radius of curvature of the non-spherical surface at the vertex of the optical axis and wherein the optical elements have the following data:
$f = 13.0$
$FNo = 4.0$
$2\omega = 119°$

| No. | R | D | Nd | νd |
|---|---|---|---|---|
| 1 | 147.341* | 4.000 | 1.64000 | 60.2 |
| 2 | 32.584 | 13.145 | | |
| 3 | 41.808 | 3.000 | 1.64000 | 60.2 |
| 4 | 31.301 | 10.825 | | |
| 5 | 76.838 | 5.000 | 1.80518 | 25.4 |
| 6 | 154.018 | 0.200 | | |
| 7 | 101.770 | 2.500 | 1.77250 | 49.6 |
| 8 | 20.599 | 5.525 | | |
| 9 | 25.164 | 9.624 | 1.75520 | 27.5 |
| 10 | 152.475 | 1.500 | | |
| 11 ⎫ T | ∞ | 1.800 | 1.51633 | 64.1 |
| 12 ⎭ | ∞ | 0.500 | | |
| 13 | 14.142 | 1.000 | 1.88300 | 41.0 |
| 14 | 7.486 | 3.000 | | |
| 15 | 26.776 | 5.891 | 1.75520 | 27.5 |
| 16 | 43.727 | 7.000 | 1.51633 | 64.1 |
| 17 | −10.620 | 2.500 | | |
| 18 | −25.398 | 4.788 | 1.75520 | 27.5 |
| 19 | −915.785 | 1.000 | | |
| 20 | −24.503 | 1.000 | 1.88300 | 41.0 |
| 21 | 36.421 | 5.000 | 1.48749 | 70.1 |
| 22 | −13.504 | 0.100 | | |
| 23 | 62.000 | 4.500 | 1.77250 | 49.6 |
| 24 | −37.307 | | | |

ΣD = 93.398
b, f = 36.500 wherein the symbols have the following meaning:
R : the radii of curvature of the respective lens elements;
D : the axial thicknesses of the respective lens elements and axial air spaces between the successive lens elements;
Nd : the refractive indices for the $d$ line of the sodium spectrum of the respective material glasses;
T : an interchangeable filter;
S : a diaphragm;

* the radius of curvature of the non-spherical surface at the vertex on the optical axis;

and wherein the non-spherical surface has a configuration as indicated by the following relationship between X and Y:

| Y | X |
|---|---|
| 0. | 0. |
| 2.00000 | 0.01361 |
| 4.00000 | 0.05490 |
| 6.00000 | 0.12523 |
| 8.00000 | 0.22689 |
| 10.00000 | 0.36309 |
| 12.00000 | 0.53800 |

-continued

| Y | X |
|---|---|
| 14.00000 | 0.75669 |
| 16.00000 | 1.02513 |
| 18.00000 | 1.35012 |
| 20.00000 | 1.73919 |
| 22.00000 | 2.20046 |
| 24.00000 | 2.74257 |
| 26.00000 | 3.37461 |
| 28.00000 | 4.10610 |
| 30.00000 | 4.94735 |
| 32.00000 | 5.90993 |
| 34.00000 | 7.00783 |
| 36.00000 | 8.25921 |
| 38.00000 | 9.68926 |
| 40.00000 | 11.33427 |
| 42.00000 | 13.24758 |
| 44.00000 | 15.50770 |

* * * * *